(12) United States Patent
Laugt et al.

(10) Patent No.: US 11,007,901 B2
(45) Date of Patent: May 18, 2021

(54) SEAT (71) Applicant: CROUZET AUTOMATISMES, Valence (FR)

(72) Inventors: Dorian Laugt, Romans-sur-Isere (FR); Ludovic Niguet, Toulaud (FR)

(73) Assignee: CROUZET AUTOMATISMES, Valence (FR)

( * ) Notice: Subject to any disclaimer, the term of this patent is extended or adjusted under 35 U.S.C. 154(b) by 0 days.

(21) Appl. No.: 16/624,967

(22) PCT Filed: Jun. 15, 2018

(86) PCT No.: PCT/FR2018/051434
§ 371 (c)(1),
(2) Date: Dec. 20, 2019

(87) PCT Pub. No.: WO2018/234667
PCT Pub. Date: Dec. 27, 2018

(65) Prior Publication Data
US 2020/0215933 A1 Jul. 9, 2020

(30) Foreign Application Priority Data

Jun. 23, 2017 (FR) ...................................... 1755804

(51) Int. Cl.
B60N 2/70 (2006.01)
A47C 7/18 (2006.01)
(Continued)

(52) U.S. Cl.
CPC ........... *B60N 2/002* (2013.01); *B60N 2/7017* (2013.01)

(58) Field of Classification Search
CPC ....... B60N 2/002; B60N 2/7017; B60N 2/879
See application file for complete search history.

(56) References Cited

U.S. PATENT DOCUMENTS 4,865,379 A 9/1989 Aoki et al.
5,176,424 A * 1/1993 Tobita .................. A47C 27/082
297/284.1
(Continued)

FOREIGN PATENT DOCUMENTS

CN 203637763 U 6/2014
FR 2854363 A1 11/2004
(Continued)

OTHER PUBLICATIONS

International Search Report and International Written Opinion for International Application PCT/FR2018/051434, dated Aug. 21, 2018, 18 pages (including English translation).

(Continued)

*Primary Examiner* — Shin H Kim
(74) *Attorney, Agent, or Firm* — TraskBritt (57) ABSTRACT

A seat comprising:
  cushioning made from flexible material comprising a blind cavity,
  an instrumented unit made from flexible material received inside the cavity, this instrumented unit comprising:
    an oblong housing, this oblong housing comprising sidewalls that extend mainly toward the inside of the instrumented unit from an entrance situated on one of the side faces of the instrumented unit, this entrance being suitable for allowing an electric device to be inserted into the housing, and
    the electric device received in its entirety inside this housing.

11 Claims, 2 Drawing Sheets (51) Int. Cl.
*B29C 44/12* (2006.01)
*B60N 2/00* (2006.01)

(56) References Cited

U.S. PATENT DOCUMENTS

| | | | | |
|---|---|---|---|---|
| 6,089,657 | A * | 7/2000 | Banno | A47C 7/18 297/218.1 |
| 2004/0012238 | A1 | 1/2004 | Zenba et al. | |
| 2004/0262963 | A1 * | 12/2004 | Ali | G01G 19/4142 297/217.3 |
| 2006/0057900 | A1 * | 3/2006 | Lawrence | B60R 22/48 439/824 |
| 2006/0103192 | A1 * | 5/2006 | Norton | B60N 2/002 297/217.2 |
| 2008/0315639 | A1 * | 12/2008 | Wenmackers | B60N 2/002 297/217.3 |
| 2013/0200670 | A1 * | 8/2013 | Oman | B60R 21/01556 297/217.3 |
| 2014/0008948 | A1 * | 1/2014 | Rockwell | B60N 2/002 297/217.3 |
| 2014/0246887 | A1 * | 9/2014 | Clos | G01L 1/04 297/217.3 |
| 2015/0210192 | A1 * | 7/2015 | Benson | B60N 2/525 297/217.2 |
| 2015/0283922 | A1 * | 10/2015 | Kordel | B60N 2/7094 297/217.3 |
| 2017/0101040 | A1 * | 4/2017 | Shinohara | B60N 2/7017 |
| 2017/0122719 | A1 * | 5/2017 | Fukuda | B60N 2/002 |
| 2020/0215933 | A1 * | 7/2020 | Laugt | B60N 2/7017 |
| 2020/0282886 | A1 * | 9/2020 | Fukuta | A47C 27/15 |

FOREIGN PATENT DOCUMENTS

| | | |
|---|---|---|
| FR | 2870666 A1 | 11/2005 |
| FR | 3053785 A1 | 1/2018 |
| JP | 2005-059646 A | 3/2005 |
| JP | 2005-170075 A | 6/2005 |
| JP | 2005-199935 A | 7/2005 |
| JP | 2005-199936 A | 7/2005 |
| JP | 2005-287795 A | 10/2005 |
| JP | 2007-106253 A | 4/2007 |
| JP | 2008-279995 A | 11/2008 |
| JP | 2014-084069 A | 5/2014 |
| WO | 00/78521 A1 | 12/2000 |
| WO | 2013/178486 A1 | 12/2013 |
| WO | 2014/075953 A1 | 5/2014 |

OTHER PUBLICATIONS

European Communication pursuant to Article 94(3) EPC for European Application No. 18735683, dated Oct. 16, 2020, 9 pages.

* cited by examiner

SEAT

CROSS-REFERENCE TO RELATED APPLICATIONS

This application is a national phase entry under 35 U.S.C. § 371 of International Patent Application PCT/FR2018/051434, filed Jun. 15, 2018, designating the United States of America and published in French as International Patent Publication WO 2018/234667 A1 on Dec. 27, 2018, which claims the benefit under Article 8 of the Patent Cooperation Treaty to French Patent Application Serial No. 1755804, filed Jun. 23, 2017.

TECHNICAL FIELD

The present disclosure relates to a seat. The disclosure also relates to an instrumented unit for this seat, and also to a method for manufacturing this seat.

BACKGROUND

Known seats comprise:
a cushioning made from a flexible material comprising a blind cavity, this blind cavity comprising:
  an opening opening out on one side of the cushioning,
  a base located on the side opposite the opening, and
  lateral walls extending from the periphery of the base as far as the periphery of the opening,
an instrumented unit made from flexible material received inside the cavity, this instrumented unit comprising:
  an interior face turned toward the base of the cavity,
  an exterior face located on the side opposite the interior face and directly exposed to the exterior of the cushioning,
  lateral faces that extend from the periphery of the interior face as far as the periphery of the exterior face, these lateral faces being shaped such as to hold the instrumented unit wedged inside the cavity by interaction of form with the lateral walls of the cavity, and
  an electrical device.

A seating pad of such a seat is, for example, described in application JP2005287795. In this application, the instrumented unit is a foam block with the electrical device adhesively bonded to the interior face thereof. More precisely, the electrical device is a device capable of detecting the presence of a user sitting on the seating pad. Thus, after insertion of this instrumented unit inside the cavity of the cushioning, the electrical device is wedged inside the seating pad. More precisely, the electrical device is wedged between the base of the cavity and the interior face of the instrumented unit.

Such a seating pad offers numerous advantages. For example, the electrical device may easily be located at any depth under the upper face of the seating pad. It is then possible to place it at such a depth that the user sitting on this seating pad is unaware of the presence of this electrical device. This thus makes it possible to preserve unchanged the comfort of the seating pad.

The means for mounting this seating pad are identical to those for a seating pad without an electrical device. Indeed, the electrical device is entirely located inside the seating pad with the exception, optionally, of wires for electrically connecting this electrical device to an electronic processing unit.

Mounting and, optionally, removal of the electrical device is simple because it can be carried out without using a tool. Indeed, a unit made from flexible material can easily be inserted inside a cavity manually by an operator. Mounting and removal are likewise simplified by the fact that the unit made from flexible material is held inside the cavity by simple interaction of form with the lateral walls of this cavity.

It is not always necessary to provide supplementary means for fixing the instrumented unit inside the cavity.

Lastly, the fact that the electrical device is already secured in the unit made from flexible material makes it possible to fix the unit made of flexible material and the electrical device inside the cushioning in one single operation.

However, it is desirable to improve such a seat, in particular in order to further simplify the manufacture thereof.

The prior art also discloses:
WO2013/178486A1, and
FR2854363A1.

BRIEF SUMMARY

A subject of the present disclosure is thus such a seat as claimed in claim 1.

In the claimed seat, the electrical device is received inside a housing that extends toward the interior of the unit made from flexible material. Hence, the electrical device is retained inside the unit made from flexible material by the lateral flanks of this housing. It is thus no longer necessary to adhesively bond the electrical device to the interior face of the instrumented unit. This therefore simplifies the method for manufacturing the seating pad. Furthermore, the claimed seat preserves the advantages described in the case of the seating pad of application JP2005287795, notably in terms of simplicity of mounting and removal of the electrical device inside the cushioning.

In the claimed seat, the electrical device is inserted twice into foam housings. More precisely, it is inserted once inside the housing of the instrumented unit and once inside the cavity of the cushioning. By virtue thereof, any sound disturbance from the electrical device that might arise during functioning thereof is limited.

The embodiments of this seat may comprise one or more of the features of the dependent claims.

The present disclosure also relates to an instrumented unit made from flexible material adapted such as to be implemented in the claimed seat.

Lastly, the present disclosure relates to a method for manufacturing the claimed seat as claimed in claim 11.

BRIEF DESCRIPTION OF THE DRAWINGS

The present disclosure will be better understood upon reading the following description, which is given solely by way of non-limiting example and with reference to the drawings, in which.

DETAILED DESCRIPTION

In these figures, the same references are used to denote the same elements. In the remainder of this description, the features and functions that are well-known to a person skilled in the art are not described in detail.

Figure 1:
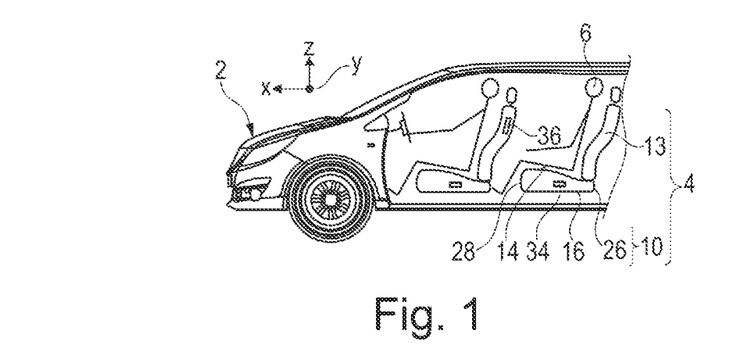
FIG. 1 is a partial schematic illustration, in vertical section, of a motor vehicle comprising a seat.

FIG. 1 shows a motor vehicle 2 equipped with a seat 4 on which a user 6 is seated. In FIG. 1, the user 6 is a rear passenger of the vehicle 2 and the seat 4 is a rear bench seat of this vehicle 2. However, everything that is described in the following text applies to any other seat and, in particular, to the other seats of a motor vehicle.

The seat 4 will now be described in greater detail with reference to FIGS. 1 and 2. The seat 4 comprises three seating pads 10, 11 and 12 (FIG. 2) arranged one beside the other in a horizontal direction Y of an XYZ orthogonal reference system. The seat 4 also comprises a back 13 (FIG. 1). In these FIGS. 1 and 2, as in the remaining figures, the horizontal is referenced by the directions X and Y of the XYZ reference system. The direction X is, here, parallel to the longitudinal direction of the vehicle 2, that is to say the direction in which the vehicle 2 moves forward in a straight line. The direction Z is the vertical direction. In the remaining text, the terms such as "upper," "lower," "top," "bottom," "above," and "below" are defined relative to the direction Z.

Here, the term "seating pad" will be given to that location of the seat 4 that is designed to receive the buttocks of a single user. In the remaining text, only the seating pad 10 is described in detail, in the knowledge that the teaching given in this particular case applies equally to any other seating pad of this seat.

The seating pad 10 comprises an upper face 14 (FIG. 1) on which the buttocks of the user 6 rest directly and a lower face 16 located on the opposite side. The faces 14 and 16 extend principally parallel to a horizontal plane, called the "seating pad plane."

Figure 2:
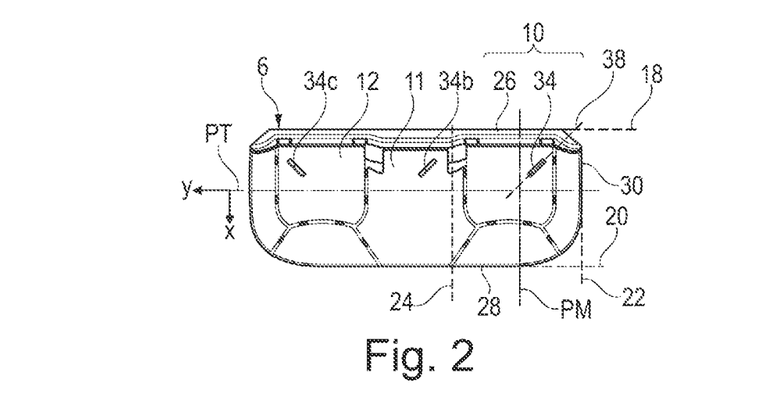
FIG. 2 is an illustration, in top view, of the seating pad of the rear seat of the vehicle in FIG. 1.

The orthogonal projection of the seating pad 10 in the seating pad plane is located inside a rectangle. This rectangle is the rectangle of smallest surface area that entirely contains this orthogonal projection. This rectangle has:

a rear side 18, a front side 20, and two lateral sides 22 and 24 (FIG. 2).

The sides 18 and 20 are parallel to the direction Y. They pass, respectively, via a rear edge 26 and a front edge 28 of the seating pad 10. The rear edge 26 is that which is closest to the back 13. This edge is generally connected to this back 13. The front edge 28 is located on the side opposite the edge 26 in the direction X. The sides 18 and 20 are symmetrical with one another relative to a transverse vertical plane PT.

The lateral sides 22 and 24 are located on either side of the location where the user 6 sits. They are symmetrical with one another relative to a vertical mid-plane PM of the seating pad 10. In the case represented here, in which the seating pad 10 is the seating pad furthest to the right of the seat 4, the lateral side 22 is located at a right hand lateral edge 30 of the seating pad 10.

In the case of a bench seat, the lateral side 24 does not correspond to an edge of the seating pad. By contrast, the lateral side 24 merges with the right hand lateral side of the central seating pad 11 of the seat 4. Thus, if the seating pad in question is the central seating pad 11 of a bench seat, neither of the lateral sides corresponds to an edge of the seat 4.

The planes PT and PM intersect along an axis passing via the center of the rectangle. They thus divide this rectangle that surrounds the seat 4 into four identical quarters.

It is useful to detect the presence of a user seated on the seating pad 10 such as to command, as a function of this information, one or more electronic devices of the vehicle 2. To that end, the seating pad 10 comprises an electrical device 34 for detecting the bearing force exerted by the weight of the user 6 when the latter is seated on the seating pad 10. The bearing force is exerted principally vertically from top to bottom.

By way of illustration, the device 34 is used, here, to command the triggering of the inflation of an airbag 36 (FIG. 1), sometimes also called an "inflatable cushion." For example, the airbag 36 is housed in a lateral wall or in a dashboard of the vehicle 2. Thus, when the device 34 detects the absence of a sufficient bearing force, the triggering of the airbag 36 is, for example, prevented.

Typically, in order to not accidentally prevent the triggering of the airbag 36 or, on the contrary, to not accidentally authorize the triggering of this airbag 36, the device 34 must comply with the following constraints:

it must detect the presence of a user weighing more than 29 kg who is sitting on the seating pad 10, it must detect the presence of a child sitting on a child seat that is itself resting on the seat 4, when the weight of the child seat and of the child is greater than 15 kg, it must not detect an object, weighing less than 5 kg, placed on the seating pad 10, and it must not detect a child sitting in a child seat secured to the seating pad 10 by an anchoring mechanism compliant with the ISOFIX standard (standard ISO 13216-1: 1999) or compliant with the US LATCH standard ("Lower Anchors and Tethers for Children").

To that end, the device 34 is a device comprising a streamlined face 68 (FIG. 3) that is sensitive to the bearing force. This face 68 extends principally along a horizontal axis 38.

With a view to complying with the constraints set forth above, the device 34 is preferably arranged in one of the two rear quarters of the rectangle delimited by the sides 18, 20, 22 and 24. Here, the device 34 is arranged inside the right hand rear quarter. For a more detailed description of the positioning of the device 34 inside this right hand rear quarter, the reader is referred to the patent application filed in France on Jul. 6, 2016, by the applicant, under number FR1656499.

In FIG. 2, detection devices 34b and 34c, housed inside, respectively, the seating pads 11 and 12 are visible. The positioning thereof inside their respective seating pad can be inferred from the above explanations.

Figure 3:
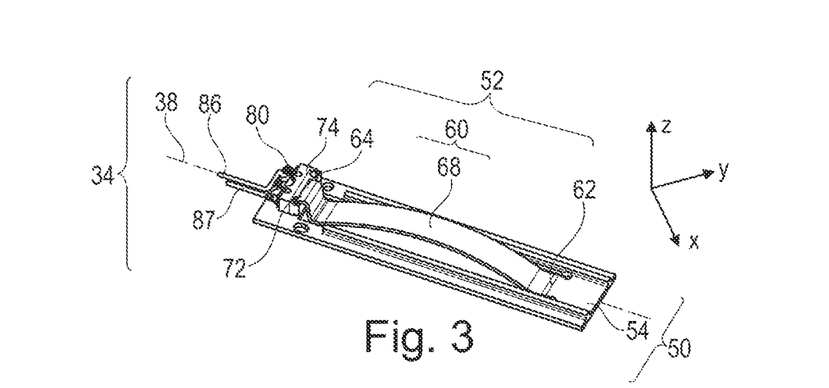
FIG. 3 is a perspective illustration of an electrical detection device housed in the seating pad of FIG. 2.

FIG. 3 shows a possible embodiment of the device 34. Here, the device 34 is one of those described in the above-mentioned application FR1656499. Thus, for a more detailed description of this device, the reader is referred to that patent application. It will simply be observed that the device 34 comprises:

a rigid support 50 that extends principally in a horizontal plane, and a leaf spring 52.

The support 50 comprises a horizontal planar plate 54 that is rigid under tension and flexurally rigid. This plate is made from a hard material such as a metal, for example steel, or hard plastics. In this description, "hard material" denotes a material of which the Young's modulus at 25° C. is greater than 1 GPa and, preferably, greater than 10 GPa or 50 GPa or 100 GPa.

In this embodiment, the spring 52 comprises a single leaf 60 that extends principally along the axis 38, from a proximal end 62 as far as a distal end 64. The proximal end 62 is mounted, with no degree of freedom, on the support 50. Conversely, the end 64 moves relative to the support 50. Here, the leaf 60 forms a single continuous block of material with the support 50.

Between the ends 62, 64, the leaf 60 is curved and has a convex bearing face 68 on which the bearing force to be detected is directly exerted. To that end, the width of the face 68 is greater than 0.8 cm or 1 cm and generally less than or equal to 3 cm. In order to offer enhanced sensitivity in the direction of the axis 38, the length L of the leaf 60 between the ends 62 and 64 thereof is greater than 6 cm or 8 cm, i.e., typically at least two or three times as great as the width of this same leaf. The length L is likewise generally less than 16 cm or 12 cm.

The spring 52 can be deformed, by elastic deformation of the leaf 60, between a curved shape shown in FIG. 3 and a flatter shape. The curved shape corresponds to the initial shape of the leaf 60, i.e., the shape thereof in the absence of a bearing force on the face 14.

The device 34 also comprises a mechanism 72 for translational guiding of the end 64 along the axis 38. More precisely, this mechanism 72 prevents the vertical bearing force exerted directly on the face 68 of the leaf 60 from pivoting the end 64 about a horizontal rotational axis perpendicular to the axis 38 and passing via the end 62. Under these conditions, owing to the mechanism 72, the leaf 60 converts, with the aid of a single component, the vertical bearing force into a horizontal translational movement of the end 64 along the axis 38.

A sensor 80 detects whether the movement of the end 64 exceeds a predetermined threshold Si. For example, the sensor 80 comprises a pushbutton. This sensor switches from an off state to an on state as soon as the pushbutton is depressed by the end 64. For example, in the off state, the sensor 80 has a resistance $R_{off}$ between the wires 86 and 87. When the bearing force deforms the leaf 60, the end 64 advances along the axis 38 and ultimately depresses the pushbutton. In response, the sensor 80 switches to its on state and has a resistance $R_{on}$ between the wires 86 and 87. Such a change in resistivity indicates to the onboard electronics of the vehicle 2 that the user 6 is sitting on the seating pad 10. In response, the onboard electronics authorize the triggering of the airbag 36 in the event of an accident. When the user 6 leaves the seat 4, the bearing force disappears. In response, the leaf 60 automatically reverts to its curved shape and the end 64 again moves away from the pushbutton. The sensor 80 thus automatically reverts to its off state.

Figure 4:
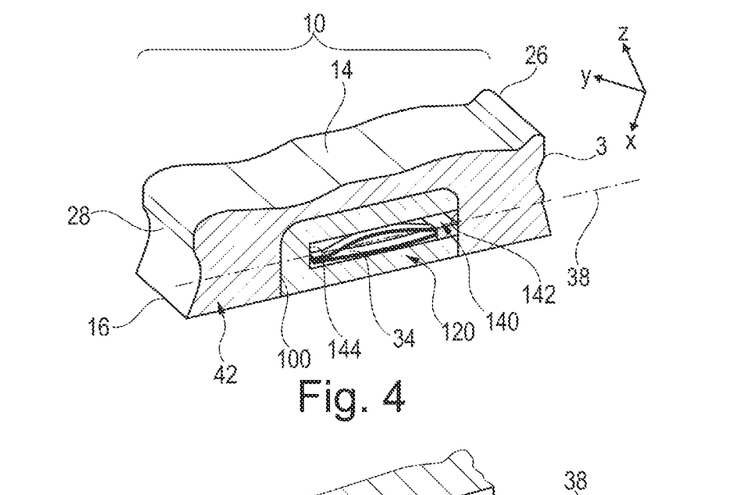
FIG. 4 is an illustration, in perspective and in vertical section, of the seating pad of FIG. 2.

FIG. 4 shows a partial view, in vertical section, of the seating pad 10 along the axis 38. The seating pad 10 comprises a cushioning 42 made entirely from a flexible material. In this description, "flexible material" denotes any material of which the hardness is less than 8 kPa and, generally, greater than 1 kPa. The hardness in kPa corresponds to the pressure that has to be exerted on a face of the flexible material in order to obtain a depression of 40% of this material. A depression of 40% corresponds to 40% of the maximum depression, which may be obtained without irreversible deformation of the flexible material. For example, maximum depression is expressed by a distance $E_{max}$ traveled by the face on which the pressure is exerted between the rest position at atmospheric pressure and the maximum depression position. The maximum depression position corresponds to the position of this face when it is subject to the maximum pressure that does not give rise to irreversible deformation of the material. Depression of 40% thus corresponds to a distance traveled by this face that is equal to $0.4E_{max}$. In the case of the flexible material of the cushioning 42, the hardness thereof is usually in one of the following ranges: [1 kPa; 3 kPa] or [3 kPa; 4.5 kPa] or [4.5 kPa; 6 kPa] or [6 kPa; 8 kPa]. The density of the flexible materials described here is often between 30 kg/m³ and 80 kg/m³.

Typically, the cushioning 42 is produced from foam and, generally, from expanding foam. "Expanding foam" denotes a foam obtained by expansion of a liquid or of a solid. For example, this may be polyurethane foam.

The edges and the upper face of the cushioning 42 are generally covered with a covering such as genuine or artificial leather or, alternatively, a fabric. This covering has not been shown in the figures. Moreover, in these figures and in the remainder of the description, the same references 14, 16, 26 and 28 are used to denote the upper and lower faces and the front and rear edges of the seating pad 10 and of the cushioning 42. Indeed, these faces and these edges are practically merged since they are not separated from one another or at most are separated only by the thickness of the covering.

In order to secure the device 34 inside the seating pad 10, the cushioning 42 comprises a cavity 100 provided in the lower face 16 thereof. This cavity 100 is shown in greater detail in FIG. 5. The cavity 100 comprises:
an opening 102 that opens out in the face 16,
a horizontal base 104 located inside the cushioning 42,
lateral walls 106 to 109 that connect the periphery of the base 104 to the periphery of the opening 102.

Figure 5:
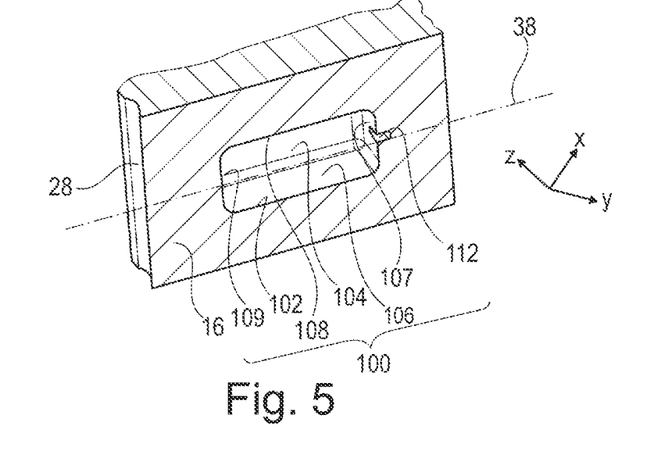
FIG. 5 is an illustration, in perspective and in vertical section, of a cushioning of the seating pad of FIG. 2.

The base 104 is located at at least 1 cm or 2 cm under the upper face 14 of the cushioning 42. Here, the base 104 is located between 2.5 cm and 4 cm under the face 14. By virtue thereof, the presence of the device 34 inside the cushioning 42 cannot be felt by the user when the latter is sitting on the seating pad 10.

In this example of an embodiment, the cavity 100 is essentially parallelepipedal. For example, the walls 106 to 109 extend vertically toward the interior of the cushioning 42 from the periphery of the opening 102. Here, the walls 106 and 108 correspond to the larger vertical faces of this parallelepiped and the walls 107 and 109 correspond to the smaller vertical faces of this parallelepiped. The walls 106 and 108 each extend principally in a vertical plane parallel to the axis 38. The walls 107 and 109 each extend principally in a vertical plane perpendicular to the axis 38. In this example of an embodiment, a notch 112 is hollowed out in the wall 107 such as to guide the wires 86 and 87 of the device 34 toward the exterior of the seating pad 10.

The seating pad 10 also comprises an instrumented unit 120. The unit 120 is shown in greater detail in FIG. 6. For example, except for the device 34, the unit 120 is made entirely in the same flexible material as that used to produce the cushioning 42.

Figure 6:
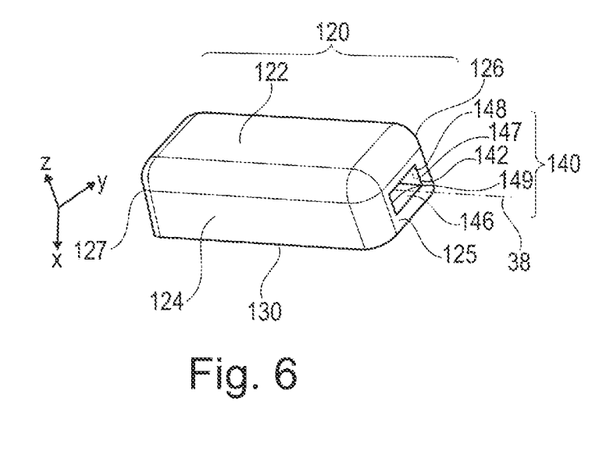
FIG. 6 is an illustration, in perspective, of an instrumented unit of the seating pad of FIG. 2.

The unit 120 comprises an interior face 122 designed to be held bearing directly against the base 104 of the cavity 100. To that end, the unit 120 is retained inside the cavity 100 by interaction of form between its lateral faces 124 to 127 and the lateral walls 106 to 109. To that end, the form of the unit 120 is identical to the form of the cavity 100, or slightly larger than the form of the cavity 100. "Slightly larger" denotes the fact that the unit 120 comprises at least one horizontal cross section that is larger and/or longer than the corresponding horizontal cross section of the cavity 100. Moreover, the dimensions of the unit 120 are such that it can be inserted manually, without a tool, by a human being, inside the cavity 100 until the interior face 122 enters into contact with the base 104. When the interior face 122 is held in contact with the base 104, the unit 120 is said to be in its pushed-in position.

The fact that at least one horizontal cross section of the unit 120 has dimensions greater than or equal to the dimensions of the corresponding horizontal cross section of the cavity 100 makes it possible, by mechanical friction, to retain the unit 120 in its pushed-in position between the faces 124 to 127 and the walls 106 to 109.

Here, the unit 120 thus has an essentially parallelepipedal form. The faces 124 and 126 correspond to the larger vertical faces of this parallelepiped and are parallel to the axis 38 in the pushed-in position. The faces 125 and 127 correspond to the smaller vertical faces of this parallelepiped and are practically perpendicular to the axis 38 in the pushed-in position.

In this embodiment, to facilitate the insertion of the unit 120 inside the cavity 100, the borders located at the intersection of the face 122 with the lateral faces 124 to 127 are rounded. For example, they have a radius of curvature greater than 1 mm or 5 mm. Optionally, to further facilitate the insertion of the unit 120 inside the cavity 100, the faces 124 to 127 slope slightly toward the interior of the unit 120. For example, the slope of the faces 124 to 127 is such that it forms an angle with the direction Z of between 1° and 20° and, preferably, between 4° and 10°.

The unit 120 also comprises an exterior face 130 located on the side opposite the face 122. Here, the unit 120 is shaped such that, in the pushed-in position, the face 130 is flush with the face 16 of the cushioning 42.

The thickness, in the direction Z, of the unit 120 is typically between 3 cm and 15 cm. The length of the unit 120, along the axis 38, is, for example, between 8 cm and 25 cm. The width of the unit 120, in the direction perpendicular to the axis 38, is, for example, between 5 cm and 25 cm.

The unit 120 comprises a horizontal oblong housing 140 inside which the device 34 is received. This housing 140 is, here, a blind housing that extends along the axis 38 from an inlet 142 as far as a blind base 144 (FIG. 4) located inside the unit 120 and on the side opposite the inlet 142. The length of the housing 140 along the axis 38 is greater than or equal to the length of the device 34 along the same axis. Thus, the device 34 may be entirely accommodated inside the housing 140 without projecting beyond the face 125.

Here, the housing 140 has a parallelepipedal form. The housing 140 is thus delimited by four lateral flanks 146 to 149 that each extend from the inlet 142 as far as the base 144. Here, the inlet 142 is rectangular and the larger sides thereof extend horizontally. The flanks 146 and 148 correspond to the larger horizontal faces of the parallelepiped. The flanks 147, 149 correspond to the smaller vertical faces of the parallelepiped. The flanks 146 to 149 all extend parallel to the axis 38.

The dimensions of the inlet 142 are sufficiently large to allow the insertion, manually and without a tool, by a human being, of the device 34 inside the housing 140. The dimensions of the inlet 142 and thus of the cross section of the housing 140 are also sufficiently small such that, once inserted inside the housing 140, the device 34 bears permanently on at least one of the two opposite flanks of this housing 140. Thus, the device 34 is retained inside the housing 140 by friction on the flanks 146 to 149. There is thus no need to make provision for other means for securing the device 34 inside the unit 120. Here, the support 50 bears directly on the flank 146 and the leaf 60 bears directly on the opposite flank 148. Moreover, preferably, the vertical sides of the support 50 likewise bear, respectively, on the flanks 147 and 149 of the housing 140.

Conventionally, the cushioning 42 is obtained by expansion of a foam inside a mold. In order to obtain a satisfactory surface finish for the upper face 14, the lower face of the mold corresponds to the upper face 14 of the cushioning 42 and the upper face of the mold corresponds to the lower face 16 of the cushioning 42. The cavity 100 is produced during molding of the cushioning 42. To that end, the upper face of the mold comprises a protuberance for forming the cavity 100 in the face 16. Under these conditions, the surface finish of the face 14 is better than the surface finish of the face 16 since, during expansion of the foam inside the mold, the lower parts of the mold are filled with foam before the upper parts of the mold. Moreover, the bubbles and other elements likely to create imperfections on the faces of the cushioning 42 tend to rise during the expansion of the foam and thus to be concentrated at the face 16 and the base 104.

Here, the surface finish of a face of the cushioning 42 or of the unit 120 is represented by the roughness "Ra" measured along a profile of at least 1 cm in length. Here, the roughness Ra is measured along a profile of 5 cm in length. To that end, for example, the cushioning 42 or the unit 120 is sectioned perpendicularly and in the middle of the face for which it is required to measure the roughness such as to expose a profile of this face that is 5 cm in length. Next, the straight mid-line of this profile is constructed and the divergences between the exposed profile and this straight line are noted. The roughness Ra is equal to the mean of the absolute values of the divergences noted. Typically, the straight mid-line is the line that minimizes the divergences noted.

The roughness Ra of the base 104 of the cavity 100 is often greater than or equal to 1 mm or 4 mm.

Owing to such imperfections in the base 104, when the device 34 is accommodated between the base 104 and the face 122, as described in the prior art (see, for example, application JP2005287795), the base 104 then exerts a bearing force on the face 122 that is not uniformly distributed. This modifies the way in which the device 34 functions. In particular, it modifies the sensitivity of the device 34. In fact, owing to the random distribution of the imperfections of the base 104, when the same device 34 is accommodated between the base 104 and the face 122, the bearing force exerted on the upper face 14 that causes the threshold Si to be breached will not necessarily be the same across different specimens of the seating pad 10. In order to limit this drawback, the surface finish of the flanks 146 and 148 of the housing 140 is at least twice or four times as good as the surface finish of the base 104. Thus, here, the roughness Ra of the flanks 146 and 148 is less than 0.5 mm and, preferably, less than 0.25 mm. In this embodiment, the surface finish of the flanks 147 and 149 is identical to the surface finish of the flanks 146 and 148.

Figure 7:
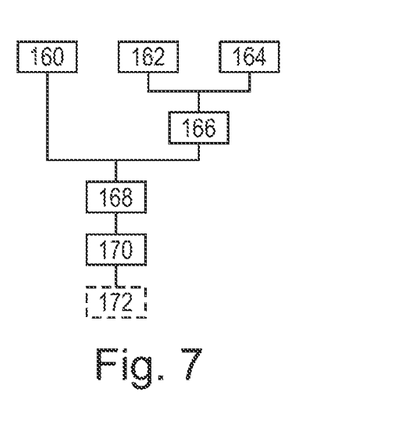
FIG. 7 is a flowchart for a method for manufacturing the seating pad of FIG. 2.

FIG. 7 shows a method for manufacturing the seating pad 10.

Initially, in a step 160, the cushioning 42 is produced conventionally by expansion of a foam inside a mold, as already described above. The mold used comprises a protuberance for forming the cavity 100 at the same time. Such a method for manufacturing the cushioning 42 is, for example, described in application JP2005287795.

In parallel, during a step 162, the foam block for the unit 120 is manufactured. For example, this foam block is also manufactured by expansion of a foam inside a mold comprising a protuberance for forming the housing 140 at the same time. In this case, this protuberance is located on the lower face or on a lateral face of the mold such that the flanks 146 to 149 of the housing 140 have a surface finish that is much smoother than the base 104 of the cavity 100.

Also, in parallel, during a step 164, the device 34 is manufactured.

Next, in a step 166, the instrumented unit 120 is manufactured by inserting the device 34 entirely inside the housing 140. To that end, typically, an operator manually inserts the device 34, through the inlet 142, inside the housing 140. During this step, the flanks 146 to 148 deform elastically. Thus, these flanks 146 to 149 then bear permanently on the inserted device 34 and thus wedge it inside the housing 140. Hence, the unit 120 equipped with the device 34 may easily be handled and stored without fear of the device 34 emerging from the housing 140.

In a step 168, the manufactured cushioning 42 and the manufactured unit 120 are supplied to an assembly workshop.

In a step 170, the instrumented unit 120 is then inserted inside the cavity 100, for example manually by an operator. During this step, the wires 86 and 87 that project beyond the inlet 142 are placed inside the notch 112. Thus, at the end of this step, the unit 120 is in its pushed-in position and held in this pushed-in position by friction between its lateral faces and the lateral walls of the cavity 100. Moreover, the device 34 is immobilized inside the unit 120 by the fact that the inlet 142 is kept closed by the lateral wall 107.

In a step 172, if necessary, the seating pad 10 thus produced may undergo supplementary finishing operations prior to being used to form the seating pad of the seat 4.

Variants of the unit 120:

The flexible material used to produce the unit 120 may be different from the flexible material used to produce the cushioning 42. For example, the flexible material of the unit 120 may be harder or, conversely, more flexible than the flexible material of the cushioning 42. The choice of the hardness of the flexible material of the unit 120 makes it possible to adjust the detection threshold of the device 34. For example, using a harder foam for the unit 120 makes the device 34 less sensitive to the bearing force, which corresponds to an increase in the detection threshold Si. For example, the hardness of the unit 120 is measured as described above in the case of the cushioning. The flexible material of the unit 120 may also be an acoustic insulation.

In a variant, the unit 120 is secured inside the cavity 100 by using supplementary securing means such as, for example, Velcro, barbs or hooks. These supplementary securing means may be used in addition to the interaction of form between the lateral faces 124 to 127 and the lateral walls 106 to 109. For example, these supplementary securing means are used to reinforce the securing of the unit 120 inside the cavity 100.

In a variant, the unit 120 comprises a plurality of housings similar to the housing 140 and in each of these housings receives a different electrical device. In another variant, a plurality of different electrical devices is received inside one and the same housing 140. Thus, insertion of such a unit made from flexible material inside the cavity 100 makes it possible, in a single operation, to secure a plurality of electrical devices inside one and the same seating pad.

The housing 140 is not necessarily a blind housing. In another embodiment, the housing 140 traverses the unit 120 right through. In this case, the housing comprises two ends that each open out, for example, in a respective lateral face of the unit 120. In this case, preferably, the housing 140 is rectilinear. Indeed, such a rectilinear housing opening out at its two ends may easily be manufactured from a block of flexible material. For example, this rectilinear housing that opens out is manufactured by water-jet cutting or using a shaped cutter.

The housing 140 is not necessarily parallelepipedal. For example, the housing 140 may have other forms, such as a cylinder with a circular base or a frustoconical form with a square base, or any other form suitable for receiving the device 34 and enabling the latter to function.

In another embodiment, in the pushed-in position of the unit 120, the interior face 122 and the base 104 are separated from one another by a hollow space. However, the thickness of this hollow space is sufficiently small such that, when a user sits on the seating pad 10, the base 104 then bears on the face 122.

Variants of the cushioning 42:

The cushioning 42 may comprise a plurality of cavities 100, inside each of which an instrumented unit made from flexible material, such as the unit 120, is received.

In a variant, the cavity 100 is hollowed out in the upper face 14 of the seating pad, not in the lower face thereof. In this case, the unit 120 is inserted inside the cushioning via the top, not via the bottom, as described above. In another variant, the cavity is hollowed out in one of the lateral edges of the cushioning 42.

The lateral walls of the cavity 100 may have forms that are more complex than those described above. For example, the lateral walls of the cavity may comprise a horizontal or vertical shoulder. The cavity 100 may have forms other than a parallelepipedal form. For example, in a variant, the cavity 100 has a trapezoidal or conical or frustoconical form. Examples of other possible shapes for the lateral walls 106 to 109 are described in application JP2005199936. In all these cases, the forms of the lateral faces of the unit 120 are then adapted, as a result, in order to correspond to the forms of the lateral walls with which they interact, such as to retain the unit 120 in its pushed-in position.

The notch 112 may be omitted.

Other Variants:

Bearing force detection devices other than those described in application FR1656499 may be used. For example, the device 34 may be replaced by the detection device described in application JP2005287795.

The electrical device is not necessarily a device for detecting a bearing force. Other electrical devices may be secured inside the seating pad 10 with the aid of the unit 120 described above. For example, the device 34 may be replaced by an electric actuator, such as a vibrating actuator, such as to inform the user of an event by means of vibrations. The electrical device may likewise be a heating resistor.

The wired connection of the device 34 may be replaced by a wireless connection.

Other methods for manufacturing the unit 120 and the cushioning 42 are possible. For example, the foam block of the unit 120 is produced, without the housing 140, by molding as described above. Next, the housing 140 is hollowed out inside this foam block, for example, by incision.

The seating pad described here may be used in any technical field where an instrumented seating pad of this type is used to produce a seat. Thus, the use of this seating pad is not limited to the production of a motor vehicle seat.

Similarly, all that has been described here in the particular case of the seating pad of a seat may also be applied to all the cushionings of the seat and, in particular, to the back of this seat. Indeed, in the case of certain applications, for example, it is necessary to measure the pressure exerted by a passenger's back on the back. This is useful, for example, to identify a particular posture of the passenger. In such cases, the seat back is instrumented. To that end, an electrical device is inserted into the cushioning of the back in the same way as has been described in the case of a seating pad.

Advantages of the Embodiments Described:

The fact that the housing 140 is blind enhances the retention and the precision of the positioning of the device 34 inside the seating pad 10.

The fact that the roughness of the flanks of the housing 140 is much less than the roughness of the base 104 makes it possible to improve the functioning of the device 34 as compared to the case where it is placed as described in application JP2005287795. Indeed, as explained previously, the lateral flanks 146 and 148 exert a more uniform pressure on the leaf 60 such that the functioning and, notably, the sensitivity of the device 34 is much less dependent on the imperfections in terms of planarity and/or the surface finish of the base 104.

The fact that the cavity 100 is provided in the lower face 16 of the cushioning 42 improves user comfort. Indeed, in this case, the device 34 is remote from the upper face 14. It can thus practically go unnoticed by the user when the latter sits on the seating pad 10. Furthermore, such a cavity 100 in the lower face of the cushioning 42 is easy to manufacture by molding this cushioning.

The fact that the device 34 bears permanently on at least two of the lateral flanks 146 to 149 makes it possible to prevent the device 34 sliding inside the housing 140 through the effect of its own weight. The device 34 is thus retained inside the housing 140 without it thereby being necessary to use supplementary means for securing the device 34 inside the housing 140, such as adhesive.

The presence of the notch 112 reduces wear on the wires 86, 87 used to connect the device 34 electrically to the exterior of the cushioning 42. Indeed, in the absence of such a notch, the radius of curvature of the wires 86, 87 at the inlet 142 is greater, which promotes wear thereon in step with deformations of the cushioning 42.

The invention claimed is:

1. A seat comprising:
    a cushioning made from a flexible material comprising a blind cavity, this blind cavity comprising:
        an opening out on one side of the cushioning,
        a base located on the side opposite the opening, and
        lateral walls extending from the periphery of the base as far as the periphery of the opening,
    an instrumented unit made from flexible material received inside the cavity, this instrumented unit comprising:
        an interior face turned toward the base of the cavity,
        an exterior face located on the side opposite the interior face and directly exposed to the exterior of the cushioning,
        lateral faces that extend from the periphery of the interior face as far as the periphery of the exterior face, these lateral faces being shaped such as to hold the instrumented unit wedged inside the cavity by interaction of form with the lateral walls of the cavity, and
        an electrical device,
    wherein:
        the instrumented unit comprises an oblong housing, this oblong housing comprising lateral flanks that extend principally toward the interior of the instrumented unit from an inlet located on one of the lateral faces of the instrumented unit, this inlet being capable of allowing the insertion of the electrical device inside the housing, and
        the electrical device is entirely received inside this housing.

2. The seat of claim 1, wherein the oblong housing is blind.

3. The seat of claim 1, wherein:
    the electrical device bears permanently on two facing lateral flanks of the housing,
    the electrical device is capable of detecting a bearing force in response to a deformation of the lateral flanks of the housing on which it bears or of generating a deformation of these lateral flanks in response to a command, and
    the roughness Ra of the lateral flanks of the housing on which the electrical device bears is at least twice as small as the roughness Ra of the base of the cavity.

4. The seat of claim 3, wherein the roughness Ra of the lateral flanks on which the electrical device bears is less than 0.5 mm.

5. The seat of claim 1, wherein the cushioning comprises:
    an upper face on which a user's buttocks rest when he is seated, this upper face extending principally parallel to a plane called a "seating pad plane," and
    a lower face located on the side opposite the upper face.

6. The seat of claim 5, wherein the cavity is provided in the lower face of the cushioning.

7. The seat of claim 5, wherein:
    two of the lateral flanks of the housing are upper and lower flanks that each extend parallel to the seating pad plane,
    the electrical device bears on the upper and lower flanks, and
    the electrical device is capable of detecting a bearing force exerted on the upper face of the cushioning in a direction of depression perpendicular to the seating pad plane.

8. The seat of claim 1, wherein the electrical device is wedged between at least two facing lateral flanks of the housing.

9. The seat of claim 1, wherein the lateral wall of the cavity facing the inlet of the oblong housing and/or the lateral face of the instrumented unit in which the inlet of the oblong housing is located comprises a notch that connects this inlet to the side of the cushioning comprising the opening of the blind cavity.

10. An instrumented unit made from flexible material for a seat, this instrumented unit being specifically adapted to be implemented in a seat as claimed in claim 1, this instrumented unit comprising:
    an interior face turned toward the base of the cavity,
    an exterior face located on the side opposite the interior face and directly exposed to the exterior of the cushioning,
    lateral faces that extend from the periphery of the interior face as far as the periphery of the exterior face, these lateral faces being shaped such as to hold the instrumented unit wedged inside the cavity by interaction of form with the lateral walls of the cavity, and
    an electrical device,
    wherein:
        the instrumented unit comprises an oblong housing, this oblong housing comprising lateral flanks that extend principally toward the interior of the instrumented unit from an inlet located on one of the lateral faces of the instrumented unit, this inlet being capable of allowing the insertion of the electrical device inside the housing, and the electrical device is entirely received inside this housing and bearing on lateral flanks of the housing.

11. A method for manufacturing a seat, this method comprising:
- a) the provision of a cushioning made from flexible material comprising a blind cavity, this blind cavity comprising:
  - an opening on one side of the cushioning,
  - a base located on the side opposite the opening, and
  - lateral walls extending from the periphery of the base as far as the periphery of the opening,
- b) the provision of an instrumented unit capable of being received inside the cavity, this instrumented unit comprising:
  - an interior face turned toward the base of the cavity,
  - an exterior face located on the side opposite the interior face and directly exposed to the exterior of the cushioning,
  - lateral faces that extend from the periphery of the interior face as far as the periphery of the exterior face, these lateral faces being shaped such as to hold the instrumented unit wedged inside the cavity by interaction of form with the lateral walls of the cavity, and
  - an electrical device,
- c) the insertion of the instrumented unit inside the cavity, wherein:
  - in step b), the provided instrumented unit comprises an oblong housing, this oblong housing comprising lateral flanks that extend principally toward the interior of the instrumented unit from an inlet located on one of the lateral faces of the instrumented unit, this inlet being capable of allowing the insertion of the electrical device inside the housing, and
  - prior to step b), the method comprises the insertion, through the inlet of the oblong housing, of the electrical device entirely inside this housing.

* * * * *

UNITED STATES PATENT AND TRADEMARK OFFICE
CERTIFICATE OF CORRECTION

PATENT NO. : 11,007,901 B2  
APPLICATION NO. : 16/624967  
DATED : May 18, 2021  
INVENTOR(S) : Dorian Laugt and Ludovic Niguet Page 1 of 1

It is certified that error appears in the above-identified patent and that said Letters Patent is hereby corrected as shown below:

In the Specification
- Column 8, Line 49, change "threshold Si to" to --threshold $S_1$ to--
- Column 9, Line 44, change "threshold Si. For" to --threshold $S_1$. For--

In the Claims
- Claim 1, Column 11, Line 47, change "an opening out" to --an opening opening out--

Signed and Sealed this  
Thirteenth Day of July, 2021

Drew Hirshfeld  
*Performing the Functions and Duties of the  
Under Secretary of Commerce for Intellectual Property and  
Director of the United States Patent and Trademark Office*